(12) United States Patent
Mizutani et al.

(10) Patent No.: US 7,819,214 B2
(45) Date of Patent: Oct. 26, 2010

(54) IN-WHEEL MOTOR CAPABLE OF EFFICIENTLY COOLING MOTOR

(75) Inventors: Ryoji Mizutani, Nishikamo-gun (JP); Yasuji Taketsuna, Okazaki (JP); Yuki Tojima, Chita-gun (JP); Atsushi Torii, Nishio (JP); Shigetaka Isogai, Nishio (JP)

(73) Assignees: Toyota Jidosha Kabushiki Kaisha, Toyota (JP); Aisin Seiki Kabushiki Kaisha, Kariya-shi (JP)

(*) Notice: Subject to any disclaimer, the term of this patent is extended or adjusted under 35 U.S.C. 154(b) by 532 days.

(21) Appl. No.: 11/797,336

(22) Filed: May 2, 2007

(65) Prior Publication Data

US 2007/0246277 A1 Oct. 25, 2007

Related U.S. Application Data

(62) Division of application No. 10/921,141, filed on Aug. 19, 2004, now Pat. No. 7,228,928.

(30) Foreign Application Priority Data

Aug. 22, 2003 (JP) ............................. 2003-298947
Aug. 29, 2003 (JP) ............................. 2003-307257

(51) Int. Cl.
*B60K 11/02* (2006.01)
(52) U.S. Cl. .................... 180/65.51; 180/65.6; 475/159
(58) Field of Classification Search ............. 180/65.51, 180/65.6; 495/159, 161
See application file for complete search history.

(56) References Cited

U.S. PATENT DOCUMENTS

| 5,034,638 | A | 7/1991 | McCabria |
| 5,127,485 | A | 7/1992 | Wakuta et al. |
| 5,156,579 | A * | 10/1992 | Wakuta et al. ............... 475/161 |
| 5,163,528 | A | 11/1992 | Kawamoto et al. |
| 5,472,059 | A * | 12/1995 | Schlosser et al. ......... 180/65.51 |
| 6,100,615 | A | 8/2000 | Birkestrand |
| 6,355,996 | B1 | 3/2002 | Birkestrand |
| 6,358,173 | B1 * | 3/2002 | Klemen et al. .................. 475/5 |
| 6,725,823 | B2 * | 4/2004 | Hori et al. ............... 123/196 R |
| 6,752,227 | B1 | 6/2004 | Bachmann |
| 6,863,140 | B2 * | 3/2005 | Noreikat et al. .......... 180/65.23 |
| 7,421,928 | B2 * | 9/2008 | Klaus et al. ............... 74/606 R |
| 2005/0061565 | A1 | 3/2005 | Mizutani et al. |
| 2005/0206251 | A1 | 9/2005 | Foster |
| 2005/0236198 | A1 | 10/2005 | Jenkins |

FOREIGN PATENT DOCUMENTS

JP U 58-186776 12/1983

(Continued)

*Primary Examiner*—Glenn Dayoan
*Assistant Examiner*—John D Walters
(74) *Attorney, Agent, or Firm*—Oliff & Berridge, PLC

(57) ABSTRACT

An in-wheel motor includes a motor, a shaft, an oil pump and oil paths. The oil pump is provided on one end of the shaft. The motor includes a stator core, stator coils and a rotor. The oil pump pumps up an oil from an oil reservoir via an oil path to supply the pumped-up oil to another oil path. The another oil path supplies the oil from the oil pump to the outer periphery of the stator core of the motor from an opening end.

8 Claims, 12 Drawing Sheets

FOREIGN PATENT DOCUMENTS

| | | |
|---|---|---|
| JP | A 60-162434 | 8/1985 |
| JP | A 62-221918 | 9/1987 |
| JP | A 03-150050 | 6/1991 |
| JP | A 05-169985 | 7/1993 |
| JP | A 5-338446 | 12/1993 |
| JP | A 09-154258 | 6/1997 |
| JP | A 09-226394 | 9/1997 |
| JP | A 2001-016826 | 1/2001 |
| JP | A 2001-258209 | 9/2001 |
| JP | A 2002-058207 | 2/2002 |
| JP | A 2003-009467 | 1/2003 |

* cited by examiner

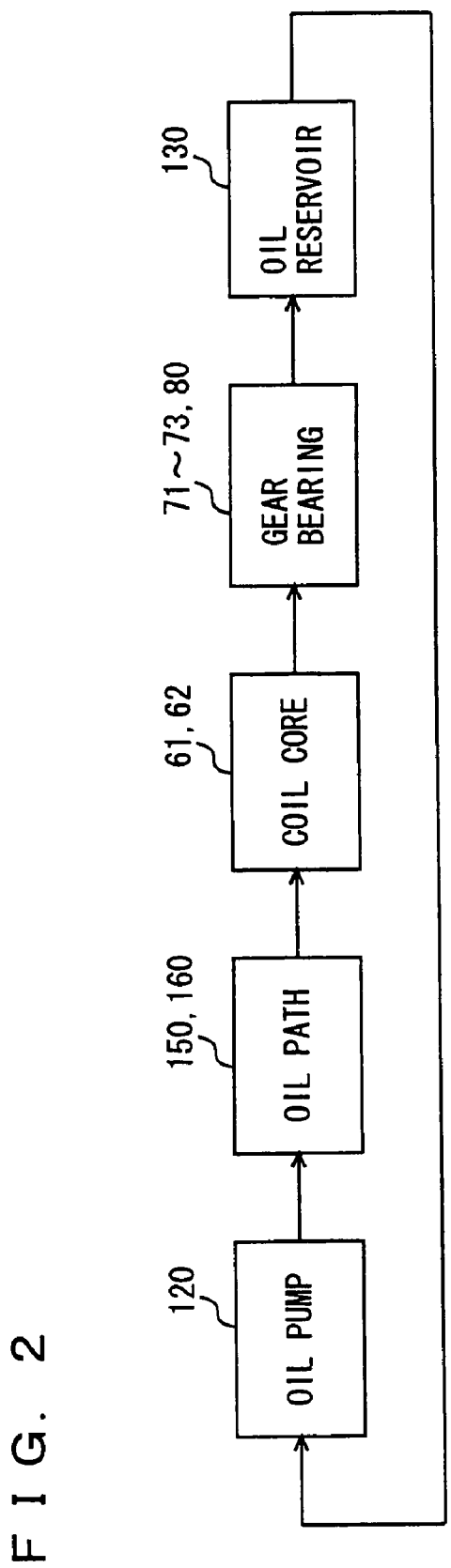
F I G. 2

IN-WHEEL MOTOR CAPABLE OF EFFICIENTLY COOLING MOTOR

This is a Division of application Ser. No. 10/921,141 filed Aug. 19, 2004, The disclosure of the prior applications is hereby incorporated by reference herein in its entirety.

This nonprovisional application is based on Japanese Patent Applications Nos. 2003-298947 and 2003-307257 filed with the Japan Patent Office on Aug. 22, 2003 and Aug. 29, 2003, respectively, the entire contents of which are hereby incorporated by reference.

BACKGROUND OF THE INVENTION

1. Field of the Invention

The present invention relates to in-wheel motors, and particularly to in-wheel motors capable of efficiently cooling their motors.

2. Description of the Background Art

Conventional in-wheel motors include a motor, an oil pump, a case and a wheel disc. The case is comprised of a motor chamber and a pump chamber. The motor is housed in the motor chamber of the case and the oil pump is housed in the pump chamber of the case.

The case containing the motor and the oil pump is placed to face the wheel disc. The oil pump circulates an oil stored in an oil reservoir to cool stator coils of the motor (Japanese Patent Laying-Open No. 5-338446).

In this way, the conventional in-wheel motor cools the motor with the circulating oil.

The cooling method disclosed in Japanese Patent Laying-Open No. 5-338446, however, encounters a problem of insufficient cooling of the motor since it is only the oil pump that circulates the oil.

In order to satisfactorily circulate the oil, the oil circulation structure has to be increased in size, which is an additional problem of the conventional cooling method.

Moreover, the cooling method disclosed in Japanese Patent Laying-Open No. 5-338446 encounters a further problem of insufficient cooling of one of the longitudinal ends of each of stator coils that is located relatively further from the oil pump.

SUMMARY OF THE INVENTION

An object of the present invention is therefore to provide an in-wheel motor capable of efficiently cooling a motor thereof.

Another object of the present invention is to provide an in-wheel motor capable of efficiently cooling a motor thereof with a compact structure.

A further object of the present invention is to provide an in-wheel motor capable of efficiently cooling one of coil-ends that is located relatively further from an oil pump.

According to an aspect of the present invention, an in-wheel motor includes a motor, a rotational axis and one of first and second oil paths. The rotational axis is rotated by an output torque of the motor. The oil pump is provided on one end of the rotational axis. The first oil path supplies an oil from the oil pump to an outer periphery of a stator core of the motor. The second oil path supplies the oil from the oil pump from a longitudinal center of the rotational axis to a coil-end of the motor.

Preferably, the in-wheel motor further includes an oil cooler. The oil cooler cools the oil from the oil pump to supply the cooled oil to the first oil path or the second oil path.

Preferably, the in-wheel motor further includes a wheel. The wheel is provided on the other end of the rotational axis. The oil cooler is configured of an oil path provided within the wheel.

Preferably, the in-wheel motor further includes an oil reservoir. The oil reservoir is provided on an end face, in the direction of the rotational axis, of a rotor included in the motor.

Preferably, the in-wheel motor further includes an oil reservoir under the rotational axis.

Preferably, the oil pump pumps up the oil from the oil reservoir and supplies the oil through the first oil path to the coil end.

According to another aspect of the present invention, an in-wheel motor includes a motor, a rotational axis and an oil pressure-feeding structure. The motor includes a stator coil. The rotational axis is rotated by an output torque of the motor. The oil pump is provided on one end of the rotational axis. The oil pressure-feeding structure pressure-feeds an oil from the oil pump to one of coil-ends of the stator coil that is provided on the other end of the rotational axis, in response to operation of the motor.

Preferably, the oil pressure-feeding structure includes a screw groove and a case. The screw groove is formed on a rotor shaft of the motor. The case is placed to face the screw groove.

Preferably, the case includes an inclined portion promoting feeding of the oil to the coil-end on the other end of the rotational axis.

Preferably, between the rotor shaft and the case a narrow spacing is formed.

Preferably, as a rotor of the motor rotates, oil entering the screw groove is supplied by a screwing action to the coil end.

Preferably, as a rotor of the motor rotates, oil entering the screw groove impinges on an inclined portion of the case by a screwing action and is supplied to the coil end.

With the in-wheel motor of the present invention, the oil is supplied from the oil pump to the outer periphery of the stator core and falls by gravitation to be supplied to the stator core. The oil then cools the stator core and stator coils.

According to the present invention, the motor can thus be cooled efficiently with the compact structure.

Moreover, with the in-wheel motor of the present invention, the oil is supplied from the oil pump to the oil path to be supplied from the longitudinal center of the rotational axis to the stator core and stator coils by the centrifugal force. The oil then cools the stator core and stator coils.

According to the present invention, the motor can thus be cooled efficiently with the compact structure.

Further, with the in-wheel motor of the present invention, the oil is forced to be cooled by the oil cooler and the cooled oil is supplied to the stator core for example.

According to the present invention, the motor can thus be cooled further efficiently.

In addition, with the in-wheel motor of the present invention, the oil supplied to the stator core is stored in the oil reservoir and then supplied again to the stator coils.

According to the present invention, the motor can thus be cooled efficiently by recycling the oil.

In addition, with the in-wheel motor of the present invention, in response to operation of the motor, the oil pressure-feeding structure pressure-feeds the oil from the oil pump to one of the coil-ends of each of the stator coils that is located relatively further from the oil pump.

According to the present invention, the coil-end located relatively further from the oil pump can efficiently be cooled.

In addition, the oil pressure-feeding structure of the present invention is comprised of the screw groove formed on the rotor shaft and the case provided to face the screw groove. In response to operation of the motor, namely rotation of the rotor shaft, the oil supplied between the screw groove and the case is supplied by screwing action of the screw groove to the coil-end located relatively further from the oil pump.

In this way, the oil can efficiently be supplied to the coil-end located relatively further from the oil pump with the simple structure.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing an oil circulation passage in the motor-driven wheel shown in FIG. 1.

DESCRIPTION OF THE PREFERRED EMBODIMENTS

Figure 1:
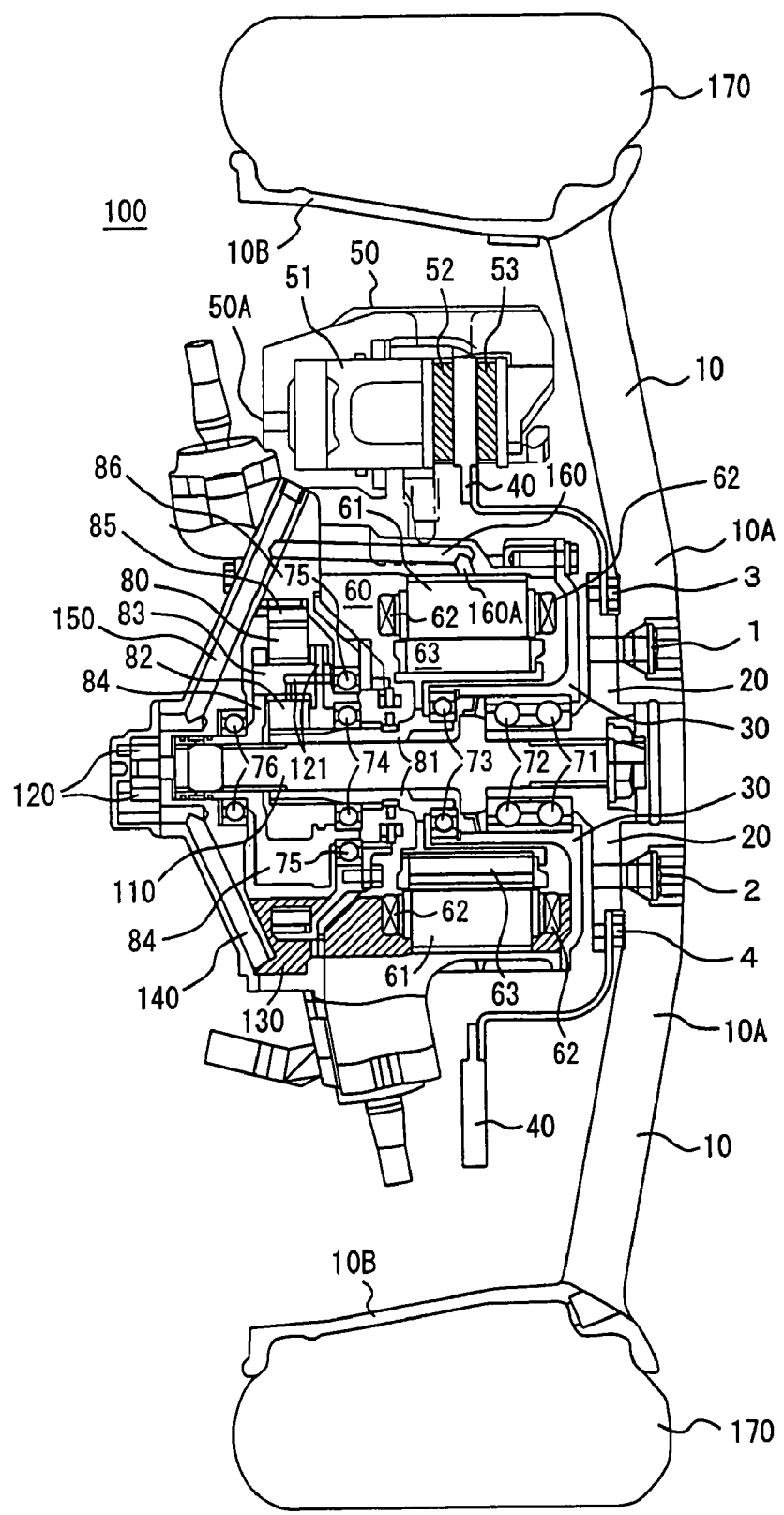
FIG. 1 is a schematic cross-sectional view of a motor-driven wheel having an in-wheel motor according to a first embodiment.

Embodiments of the present invention are hereinafter described in detail with reference to the drawings. It is noted that like components in the drawings are denoted by like reference characters and the description thereof is not repeated here.

First Embodiment

FIG. 1 is a schematic cross-sectional view of a motor-driven wheel having an in-wheel motor according to a first embodiment. Referring to FIG. 1, motor-driven wheel 100 includes a wheel disc 10, a hub 20, a housing 30, a brake rotor 40, a brake caliper 50, a motor 60, bearings 71-76, a planetary gear 80, a shaft 110, an oil pump 120, oil paths 140, 150, 160, and a tire 170.

Motor-driven wheel 100 is suspended from a frame of a body of a motor vehicle by an upper arm and a lower arm (not shown).

Wheel disc 10 is substantially in the shape of a cup and comprised of a bottom portion 10A and a cylindrical portion 10B. Wheel disc 10 houses hub 20, housing 30, brake rotor 40, brake caliper 50, motor 60, bearings 71-76, planetary gear 80, shaft 110, oil pump 120, and oil paths 140, 150, 160. Wheel disc 10 is connected to hub 20 by fastening bottom portion 10A to hub 20 with screws 1, 2. Hub 20 is spline-fitted into shaft 110. Hub 20 that is spline-fitted into shaft 110 is rotatably supported by bearings 71, 72.

Brake rotor 40 has its inner peripheral end fixed to hub 20 with screws 3, 4 and its outer peripheral end placed to pass through brake caliper 50. Brake caliper 50 includes a brake piston 51 and brake pads 52, 53. The outer peripheral end of brake rotor 40 is sandwiched between brake pads 52, 53. When a brake oil is supplied from an opening 50A, brake piston 51 moves to the right (the terms "right(ward)" and "left(ward)" are herein used to mean the right and left as seen in the drawings) to push brake pad 52 rightward. As brake pad 52 is moved by brake piston 51 to the right, brake pad 53 is moved to the left in response thereto. Brake pads 52 and 53 thus hold the outer peripheral end of brake rotor 40 therebetween to brake motor-driven wheel 100.

Housing 30 is placed on the left of hub 20. Housing 30 encloses motor 60. Motor 60 includes a stator core 61, stator coils 62 and a rotor 63. Stator core 61 is fixed to housing 30. Stator coils 62 are wound around stator core 61. When motor 60 is a three-phase motor, stator coils 62 are comprised of U-phase, V-phase and W-phase coils. Rotor 63 is provided in the inner periphery of stator core 61 and stator coils 62.

Planetary gear 80 includes a sun gear shaft 81, a sun gear 82, a pinion gear 83, a planetary carrier 84 and a ring gear 85. Sun gear shaft 81 is connected to rotor 63 of motor 60. Sun gear shaft 81 is rotatably supported by bearings 73, 74. Sun gear 82 is connected to sun gear shaft 81.

Pinion gear 83 meshes with sun gear 82 and is rotatably supported by bearings 75, 76. Planetary carrier 84 is connected to pinion gear 83 and spline-fitted into shaft 110. Ring gear 85 is fixed to a case 86.

Since hub 20 and planetary carrier 84 are spline-fitted into shaft 110, as described above, shaft 110 is rotatably supported by bearings 71, 72, 76.

Oil pump 120 is provided on one end of shaft 110 (rotational axis) while wheel disc 10 is provided on the other end thereof. Oil path 121 is provided within pinion gear 83 of planetary gear 80. Oil path 140 has one end connected to oil pump 120 and the other end inserted into oil reservoir 130. Oil path 150 has one end connected to oil pump 120. Oil path 160 has one end connected to oil path 150 and the other end located on the outer periphery of stator core 61. Oil path 160 has an opening end 160A on the outer periphery of stator core 61.

Stator core 61 and stator coils 62 as seen from wheel disc 10 are substantially circular in two-dimensional shape. Then, in order to facilitate fall by the force of gravity of the oil discharged from opening end 160A and to allow the oil to be uniformly supplied over substantially circular stator coils 62, oil path 160 and opening end 160A are positioned at the highest level of substantially circular stator core 61 and stator coils 62.

Oil pump 120 pumps up the oil stored in oil reservoir 130 via oil path 140 and supplies the pumped-up oil to oil paths 150, 160 as well as an oil path (not shown) provided within shaft 110.

Tire 170 is fixed to the rim of cylindrical portion 10B of wheel disc 10.

When AC current is supplied to stator coils 62 by a switching circuit (not shown) mounted on the body of the vehicle on which motor-driven wheel 100 is mounted, rotor 63 rotates so that motor 60 outputs a predetermined torque. The output torque of motor 60 is transmitted via sun gear shaft 81 to planetary gear 80. Planetary gear 80 converts, namely changes the output torque from sun gear shaft 81 with sun gear 82 and pinion gear 83 to output the resultant torque to planetary carrier 84. Planetary carrier 84 transmits the output torque of planetary gear 80 to shaft 110. Shaft 110 then rotates hub 20 and wheel disc 10 at a predetermined number of revolutions. Accordingly, motor-driven wheel 100 rotates at the predetermined number of revolutions.

FIG. 2 is a block diagram showing a circulation passage of the oil in motor-driven wheel 100 shown in FIG. 1. Referring to FIG. 2, oil pump 120 pumps up the oil from oil reservoir 130 via oil path 140 to supply the pumped-up oil to the oil path (not shown) provided within shaft 110 and to oil paths 150, 160.

The oil supplied into shaft 110 is discharged, as shaft 110 is rotated by the above-described mechanism, from oil holes (not shown) by a centrifugal force generated by the rotation of shaft 110. Then, oil path 121 supplies the oil discharged from shaft 110 to planetary gear 80 to lubricate planetary gear 80.

The oil supplied to oil paths 150, 160 is discharged from opening end 160A. Then, the oil is supplied to the outer periphery of cylindrical stator core 61, and the oil falls by gravitation to be supplied to stator core 61 and stator coils 62. The oil thus cools stator core 61 and stator coils 62 and thereafter lubricates bearings 71-76 and planetary gear 80. The oil that has lubricated bearings 71-76 and planetary gear 80 returns to oil reservoir 130.

In this way, the oil for motor-driven wheel 100 is circulated through the above-described passage and oil paths 150, 160 supply the oil from oil pump 120 to the outer periphery of stator core 61 of motor 60.

Accordingly, the oil can surely be poured onto stator core 61 and stator coils 62 with the above-described compact structure to efficiently cool motor 60.

Further, by supplying the oil from the outer periphery of stator core 61 to stator core 61, the gap between housing 30 and stator core 61 can be filled with the oil so that a thermal resistance between housing 30 and stator core 61 can be reduced. The amount of heat dissipated from stator core 61 to housing 30 thus increases so that core 61 and stator coils 62 are efficiently cooled.

Consequently, the available temperature range of motor 60 can be extended so that a motor vehicle having motor-driven wheels 100 mounted thereon can be driven under severe load conditions.

Further, since oil path 160 for supplying the oil to the outer periphery of stator core 61 is provided in a free space, the volume of the in-wheel motor capable of efficiently cooling motor 60 can be reduced.

It is noted that "in-wheel motor" of the first embodiment is configured of wheel disc 10, hub 20, housing 30, motor 60, bearings 71-76, planetary gear 80, shaft 110, oil pump 120, oil reservoir 130, and oil paths 121, 140, 150, 160.

Second Embodiment

Figure 3:
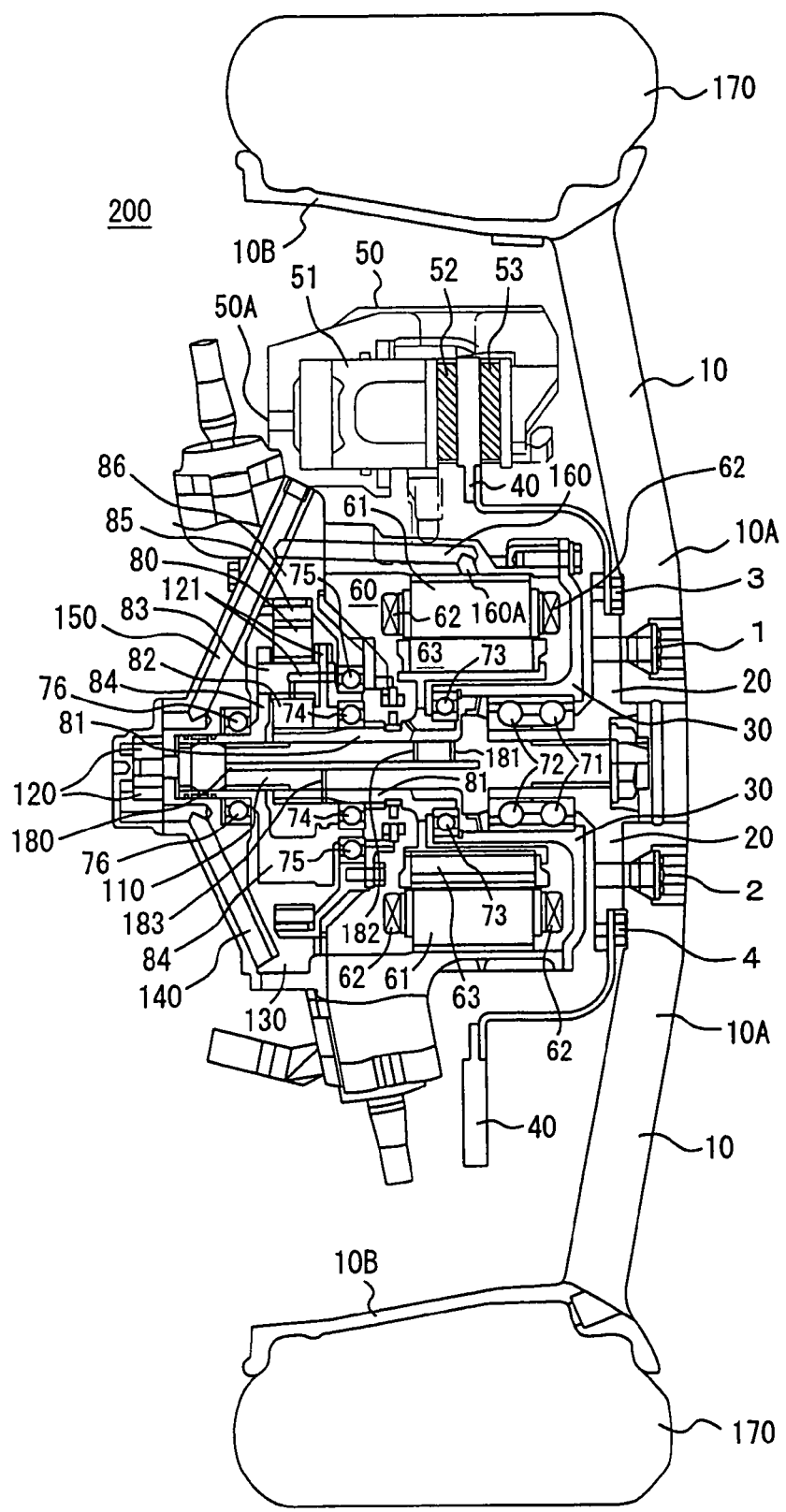
FIG. 3 is a schematic cross-sectional view of a motor-driven wheel having an in-wheel motor according to a second embodiment.

FIG. 3 is a schematic cross-sectional view of a motor-driven wheel having an in-wheel motor according to a second embodiment.

Referring to FIG. 3, motor-driven wheel 200 includes an oil path 180 in addition to the components of motor-driven wheel 100. Other specifics of motor-driven wheel 200 are identical to those of motor-driven wheel 100.

Oil path 180 is provided within shaft 110 concentrically with the central axis of shaft 110. Oil path 180 has one end connected to oil pump 120 and the other closed end. Further, oil path 180 has oil holes 181-183. Oil holes 181-183 discharge the oil from oil path 180.

When a switching circuit (not shown) supplies AC current to stator coils 62, motor 60 outputs a predetermined output torque. The output torque is transmitted by the above-described mechanism to shaft 110 that accordingly rotates at a predetermined number of revolutions.

Then, the oil supplied by oil pump 120 to oil path 180 is discharged from oil holes 181-183 by a centrifugal force caused by the rotation of shaft 110. Oil path 121 then supplies the oil discharged from shaft 110 to planetary gear 80. The oil discharged from shaft 110 is further supplied to coil-ends of stator coils 62 as well as bearings 71-76. Stator core 61 and stator coils 62 are thus cooled while bearings 71-76 and planetary gear 80 are lubricated.

Figure 4:
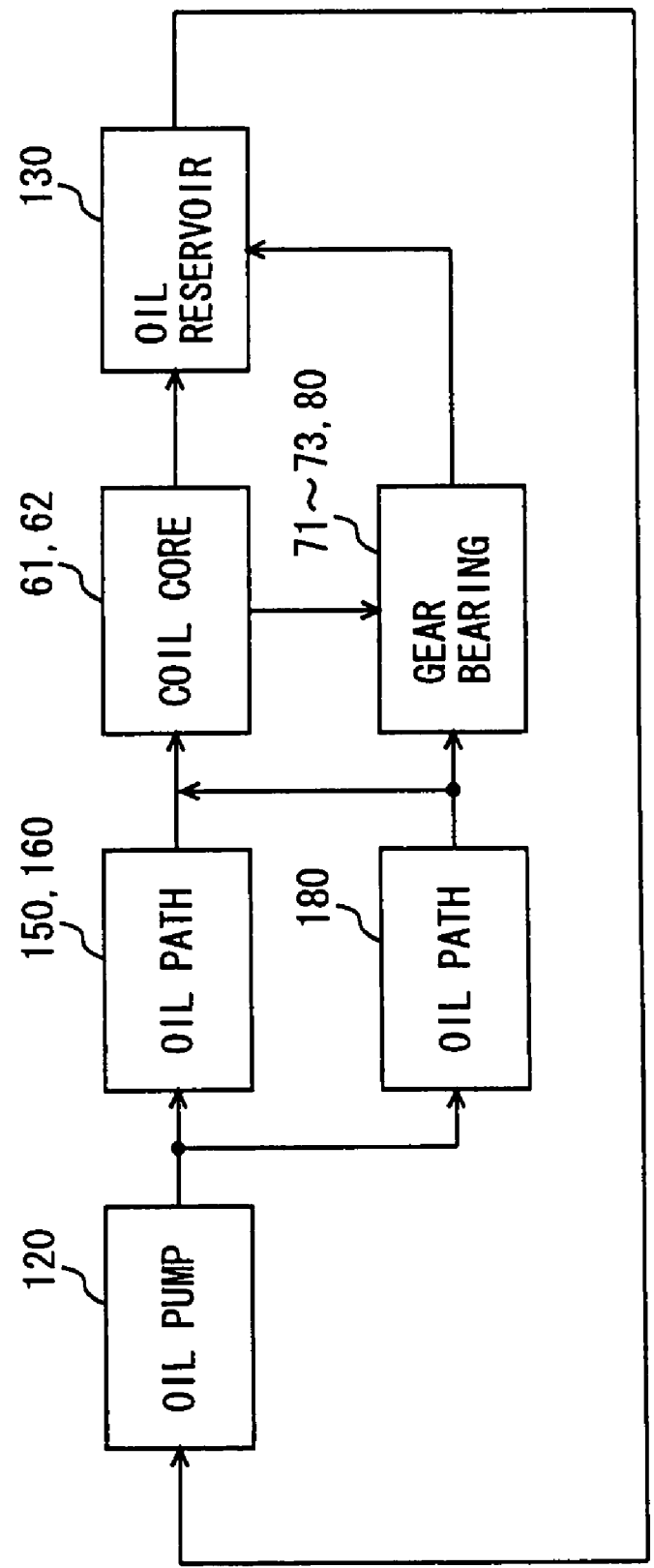
FIG. 4 is a block diagram showing an oil circulation passage in the motor-driven wheel shown in FIG. 3.

FIG. 4 is a block diagram showing a circulation passage of the oil in motor-driven wheel 200 shown in FIG. 3. Referring to FIG. 4, oil pump 120 sucks the oil from oil reservoir 130 to supply the sucked oil to oil paths 150, 160 and oil path 180. Oil paths 150, 160 discharge the oil from oil pump 120 from opening end 160A to the outer periphery of stator core 61. Further, oil path 180 discharges the oil from oil pump 120 from oil holes 181-183.

Then, the oil discharged from opening end 160A cools stator core 61 and stator coils 62 and thereafter lubricates planetary gear 80 as described above.

Further, the oil discharged from oil holes 181-183 is poured onto the coil-ends of stator coils 62, bearings 71-76 and planetary gear 80 by the centrifugal force generated by the rotation of shaft 110. In other words, oil path 180 and oil holes 181-183 supply the oil fed from oil pump 120 to the coil-ends of stator coils 62, bearings 71-76 and planetary gear 80.

The oil discharged from opening end 160A proceeds via stator core 61 to reach the coil-ends of stator coils 62 while the oil discharged from oil holes 181-183 is supplied by the centrifugal force caused by the rotation of shaft 110 to the coil-ends of stator coils 62. In this way, stator coils 62 can efficiently be cooled.

The oil is thus supplied successively from opening end 160A to stator core 61, stator coils 62 and gears (bearings 71-76 and planetary gear 80) and is supplied from oil holes 181-183 to stator coils 62 and gears (bearings 71-76 and planetary gear 80).

In this way, stator core 61 and stator coils 62 are cooled by the oil supplied from opening end 160A and by the oil supplied from shaft 110. Further, bearings 71-76 and planetary gear 80 are lubricated by the oil supplied from opening end 160A via stator core 61 and stator coils 62 as well as the oil supplied from shaft 110.

In other words, stator core 61 is chiefly cooled by the oil supplied from opening end 160A and stator coils 62 are chiefly cooled by the oil supplied from shaft 110. Accordingly, stator core 61 and stator coils 62 can further be cooled efficiently.

Consequently, the available temperature range of motor 60 can be extended so that a motor vehicle having motor-driven wheels 200 mounted thereon can be driven under severe load conditions.

Moreover, since oil path 180 and oil holes 181-183 for supplying the oil to the coil-ends of stator coils 62 are provided within shaft 110, the volume of the in-wheel motor capable of efficiently cooling motor 60 can be reduced.

It is noted that "in-wheel motor" of the second embodiment is configured of wheel disc 10, hub 20, housing 30, motor 60, bearings 71-76, planetary gear 80, shaft 110, oil pump 120, oil reservoir 130, and oil paths 140, 150, 160, 180.

In addition, the in-wheel motor of the second embodiment may supply the oil from oil pump 120 to the coil-ends of stator coils 62, bearings 71-76 and planetary gear 80 by oil path 180 and oil holes 181-183 only.

Other details of this embodiment are identical to those of the first embodiment.

Third Embodiment

Figure 5:
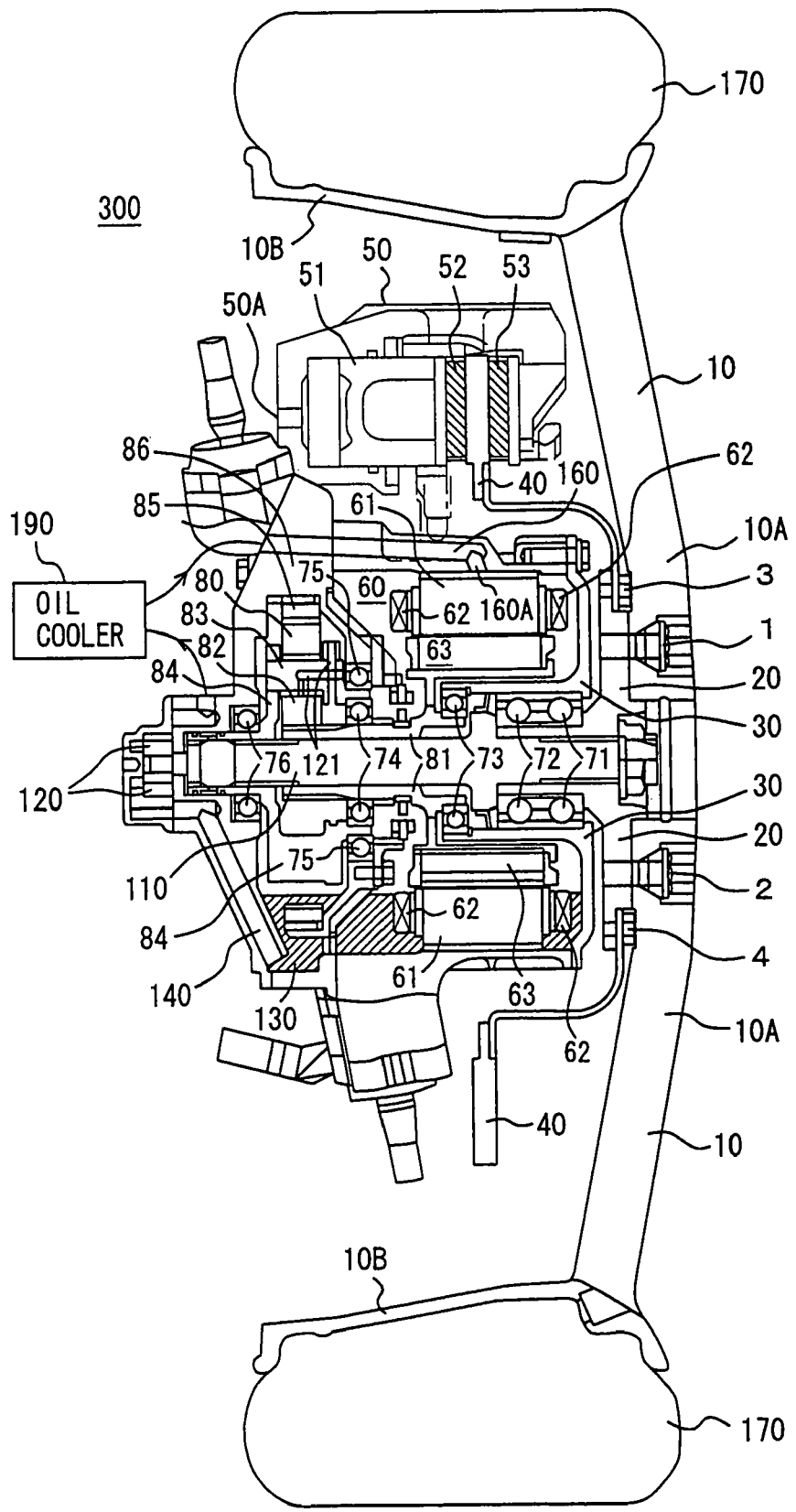
FIG. 5 is a schematic cross-sectional view of a motor-driven wheel having an in-wheel motor according to a third embodiment.

FIG. 5 is a schematic cross-sectional view of a motor-driven wheel having an in-wheel motor according to a third embodiment. Referring to FIG. 5, motor-driven wheel 300 has an oil cooler 190 instead of oil path 150 of motor-driven wheel 100. Other specifics of motor-driven wheel 300 are identical to those of motor-driven wheel 100.

Oil cooler 190 has one end connected to oil pump 120 and the other end connected to oil path 160. Oil cooler 190 is configured to have a plurality of fins arranged therein to cool the oil from oil pump 120 by means of these fins and supply the cooled oil to oil path 160.

Figure 6:
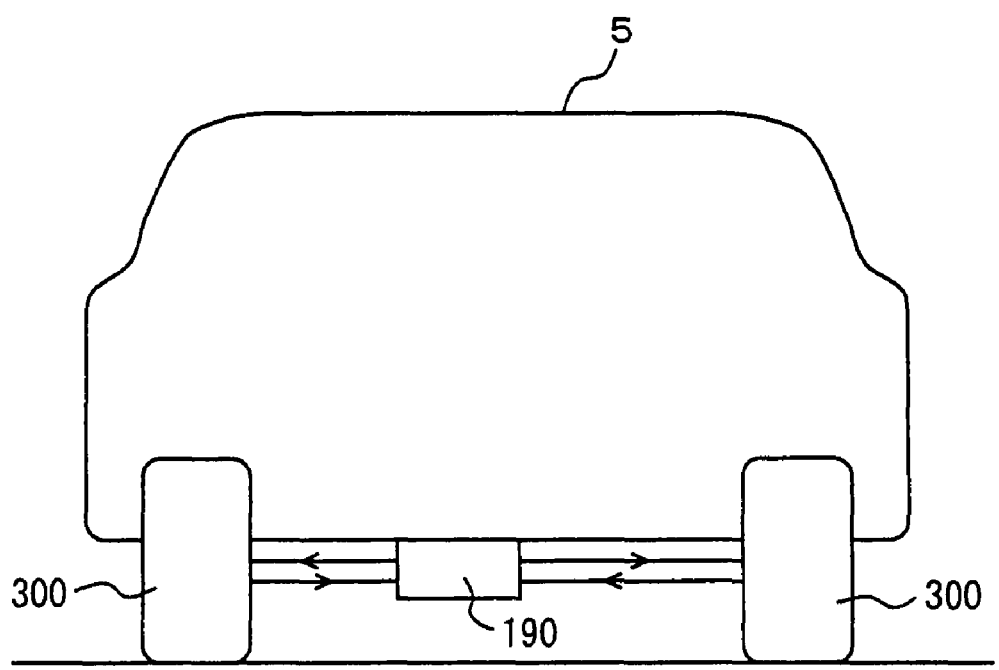
FIG. 6 illustrates a positioning of an oil cooler shown in FIG. 5.

FIG. 6 illustrates a positioning of cooler 190 shown in FIG. 5. Referring to FIG. 6, oil cooler 190 is positioned under a body 5 between two motor-driven wheels 300, 300. Oil cooler 190 receives the oil from oil pump 120 of one motor-driven wheel 300 to cool and supply the oil to oil path 160 of that one or the same motor-driven wheel 300. Further, oil cooler 190 receives the oil from oil pump 120 of the other motor-driven wheel 300 to cool and supply the oil to oil path 160 of the other or the same motor-driven wheel 300.

Figure 7:
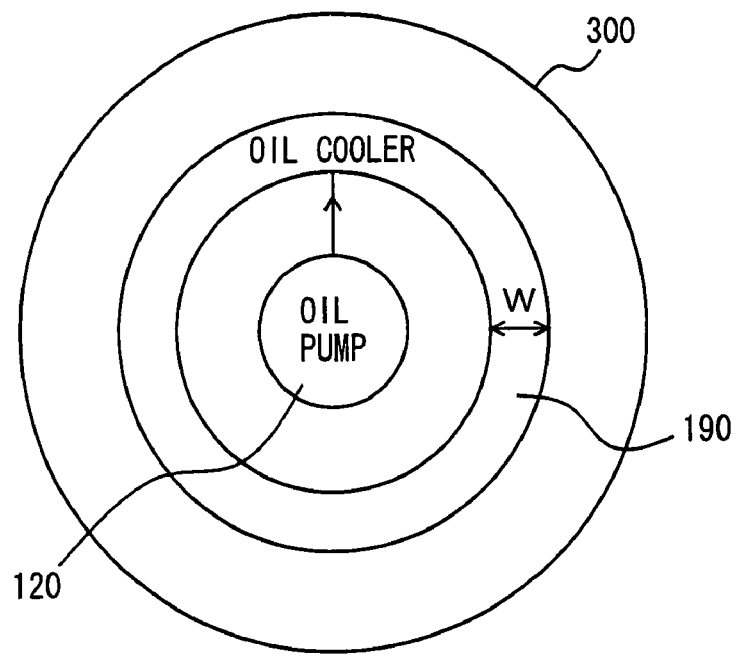
FIG. 7 illustrates another positioning of the oil cooler shown in FIG. 5.

FIG. 7 illustrates another positioning of oil cooler 190 shown in FIG. 5. Referring to FIG. 7, oil pump 120 is placed concentrically with motor-driven wheel 300. Oil cooler 190 is substantially doughnut-shaped with a predetermined width W to enclose oil pump 120. Oil cooler 190 receives the oil from oil pump 120 to cool and supply the oil to oil path 160 (located inwardly with respect to oil cooler 190 seen in FIG. 7).

Figure 8:
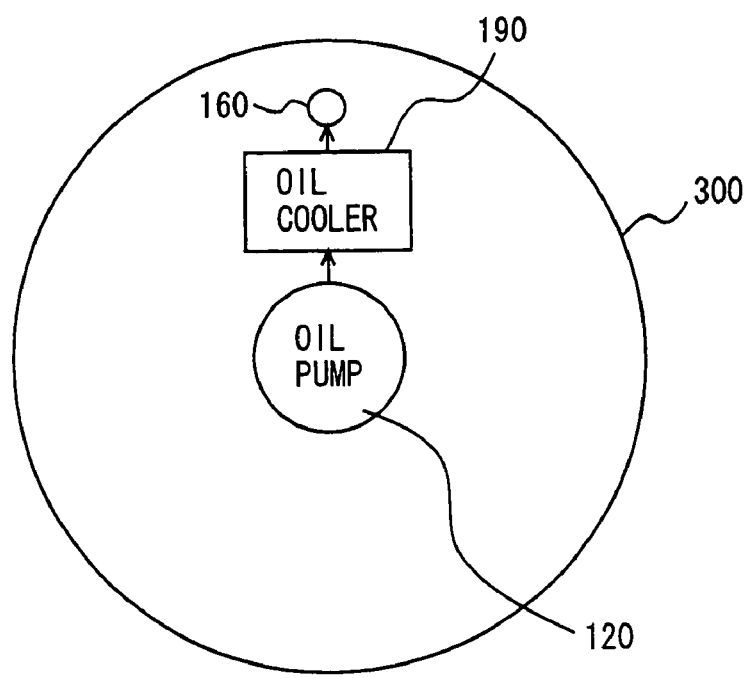
FIG. 8 illustrates a further positioning of the oil cooler shown in FIG. 5.

FIG. 8 illustrates a further positioning of oil cooler 190 shown in FIG. 5. Referring to FIG. 8, oil cooler 190 is substantially rectangular in shape and positioned near oil pump 120. Oil cooler 190 receives the oil from oil pump 120 to cool and supply the oil to oil path 160.

As seen from the above, oil cooler 190 may be placed at one of various positions to cool the oil supplied from oil pump 120.

Figure 9:
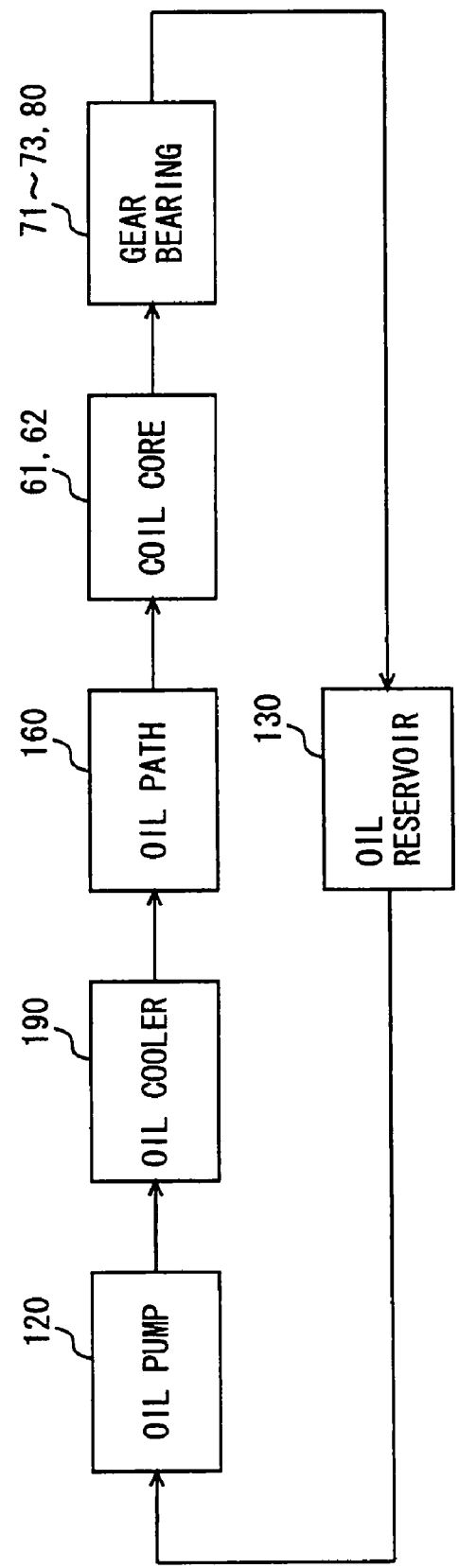
FIG. 9 is a block diagram showing an oil circulation passage in the motor-driven wheel shown in FIG. 5.

FIG. 9 is a block diagram showing a circulation passage of the oil for motor-driven wheel 300 shown in FIG. 5. Referring to FIG. 9, oil pump 120 pumps up the oil from oil reservoir 130 and supplies the pumped-up oil to an oil path (not shown) provided within shaft 110 and to oil cooler 190.

The oil supplied to the oil path provided within shaft 110 is supplied, as described above, to oil path 121, stator core 61, stator coils 62 and bearings 71-76 to lubricate bearings 71-76 and planetary gear 80 and cool stator core 61 and stator coils 62.

Oil cooler 190 cools the oil from oil pump 120 to supply the cooled oil to oil path 160. Oil path 160 discharges the oil from opening end 160A. The oil discharged from opening end 160A falls by gravitation to be supplied successively to stator core 61, stator coils 62 and gears (bearings 71-76 and planetary gear 80) and thereby cools stator core 61 and stator coils 62 and lubricates the gears.

The oil discharged from opening end 160A has been cooled by oil cooler 190 so that the cooling efficiency of stator core 61 and stator coils 62 can remarkably be improved.

Consequently, the available temperature range of motor 60 can be extended so that a motor vehicle having motor-driven wheels 300 mounted thereon can be driven under severe load conditions.

It is noted that "in-wheel motor" of the third embodiment is configured of wheel disc 10, hub 20, housing 30, motor 60, bearings 71-76, planetary gear 80, shaft 110, oil pump 120, oil reservoir 130, oil paths 140, 160, and oil cooler 190.

Other details of the third embodiment are identical to those of the first embodiment.

Fourth Embodiment

Figure 10:
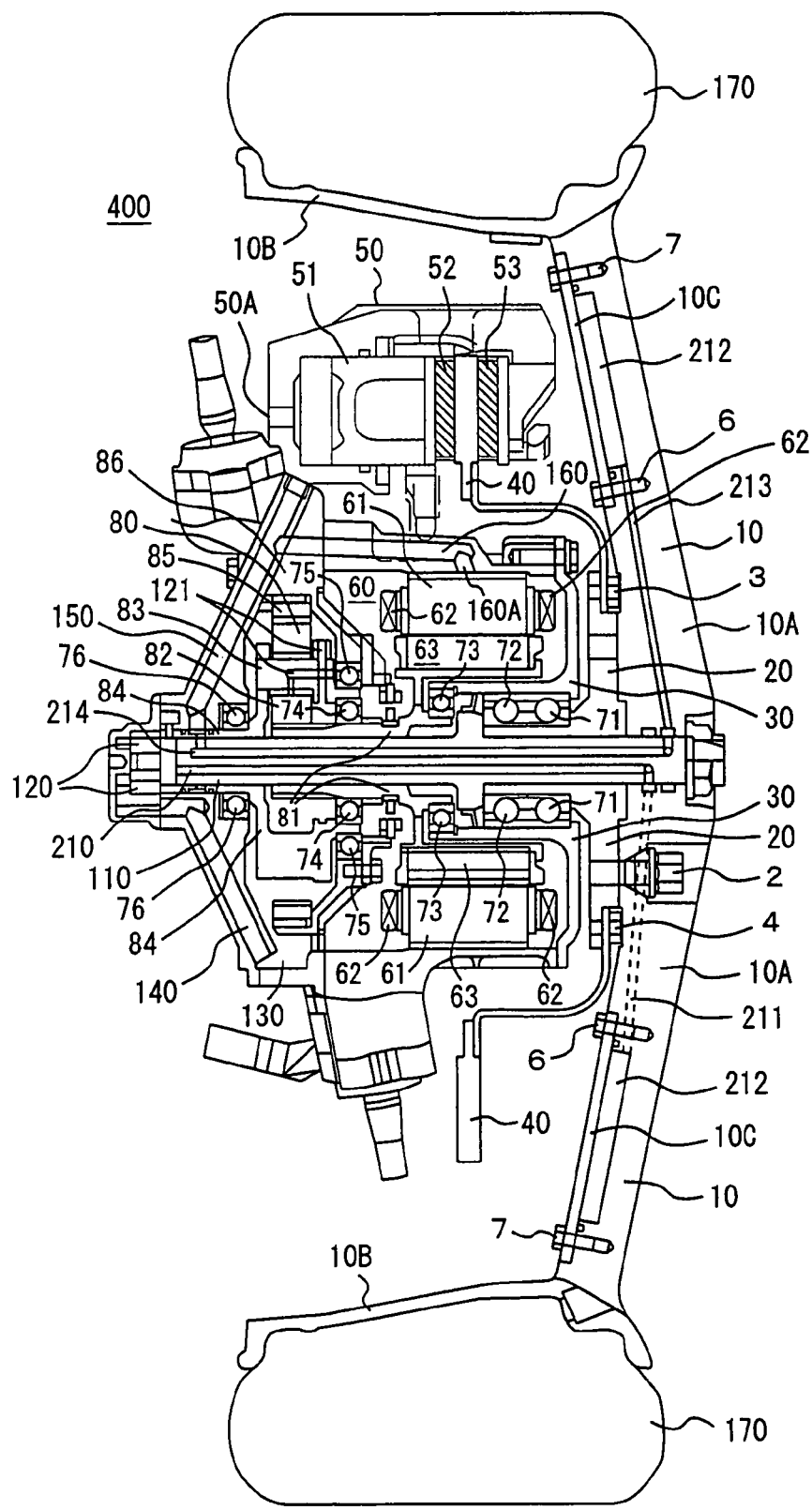
FIG. 10 is a schematic cross-sectional view of a motor-driven wheel having an in-wheel motor according to a fourth embodiment.

FIG. 10 is a schematic cross-sectional view of a motor-driven wheel having an in-wheel motor according to a fourth embodiment. Referring to FIG. 10, motor-driven wheel 400 has oil paths 210-214 in addition to the components of motor-driven wheel 100 and other specifics are identical to those of motor-driven wheel 100.

Oil path 210 is provided within shaft 110. Oil path 210 has one end connected to oil pump 120 and the other end connected to oil path 211. Oil paths 211-213 are provided within bottom portion 10A of wheel disc 10. Oil path 211 has one end connected to oil path 210 and the other end connected to oil path 212.

Oil path 212 is substantially doughnut-shaped placed within bottom portion 10A concentrically with wheel disc 10. Oil path 212 is connected to oil paths 211, 213. Further, oil path 212 is covered with a lid 10C fixed to bottom portion 10A of wheel disc 10 with screws 6. 7.

Oil path 213 has one end connected to oil path 212 and the other end connected to oil path 214.

Oil path 214 is provided within shaft 110. Oil path 214 has one end connected to oil path 213 and the other end connected to oil path 150. Therefore, oil path 150 is not connected to oil pump 120 in the fourth embodiment.

Oil pump 120 pumps up the oil from oil reservoir 130 and supplies the pumped-up oil to oil path 210. Oil path 210 supplies the oil from oil pump 120 to oil path 211, and oil path 211 supplies the oil from oil path 210 to oil path 212.

Then, oil path 212 circulates the oil from oil path 211 in the circumferential direction of wheel disc 10 by a rotational force of wheel disc 10 to cool the oil. Since wheel disc 10 is exposed to the outside air, the oil within oil path 212 dissipates heat via bottom portion 10A of wheel disc 10. Accordingly, the oil in oil path 212 is cooled.

Oil path 212 then supplies the cooled oil to oil path 213. Oil path 213 supplies the oil from oil path 212 to oil path 214. Oil path 214 supplies the oil from oil path 213 to oil path 150.

Oil path 150 supplies the oil from oil path 214 to oil path 160, and oil path 160 discharges the oil from opening end 160A.

Stator core 61 and stator coils 62 are thus cooled and thereafter bearings 71-76 and planetary gear 80 are lubricated. The oil having lubricated bearings 71-76 and planetary gear 80 returns to oil reservoir 130.

In this way, the oil for motor-driven wheel 400 is cooled through oil path 212 provided inside wheel disc 10 and thereafter supplied to stator core 61 and stator coils 62. Thus, the cooling efficiency of stator core 61 and stator coils 62 can be improved.

As discussed above, oil path 212 cools the oil and thus constitutes "oil cooler". A characteristic of the fourth embodiment is accordingly that the oil cooler is provided in wheel disc 10.

This characteristic can improve the cooling efficiency of stator core 61 and stator coils 62. Consequently, the available temperature range of motor 60 can be extended so that a motor vehicle having motor-driven wheels 400 mounted thereon can be driven under severe load conditions.

Further, since the oil cooler (oil path 212) for cooling the oil to be supplied to the outer periphery of stator core 61 is provided within wheel disc 10, the volume of the in-wheel motor capable of efficiently cooling motor 60 can be reduced.

It is noted that "in-wheel motor" of the fourth embodiment is configured of wheel disc 10, hub 20, housing 30, motor 60, bearings 71-76, planetary gear 80, shaft 110, oil pump 120, oil reservoir 130, and oil paths 140, 160, 210-214.

Other details of the fourth embodiment are identical to those of the first embodiment.

Fifth Embodiment

Figure 11:
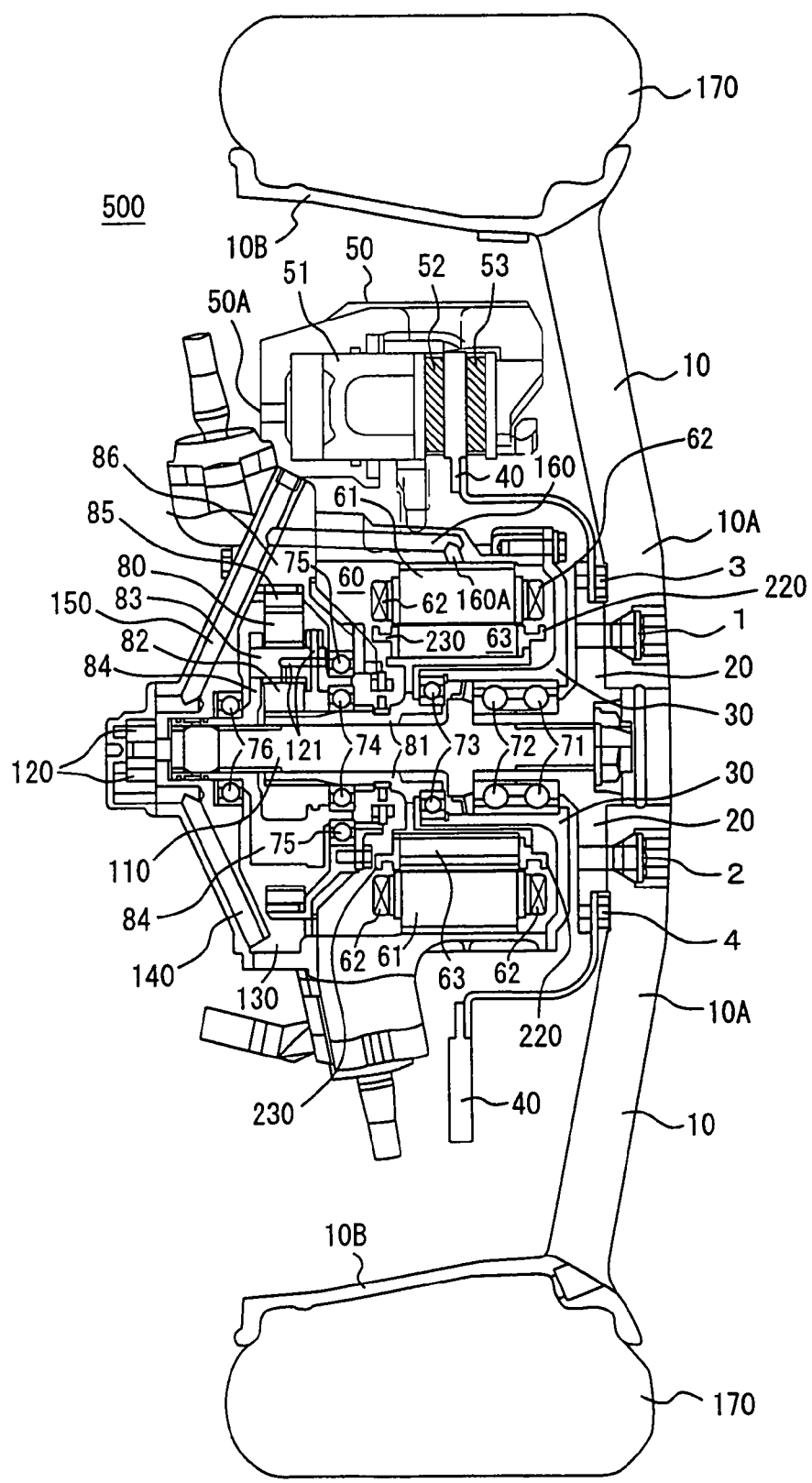
FIG. 11 is a schematic cross-sectional view of a motor-driven wheel having an in-wheel motor according to a fifth embodiment.

FIG. 11 is a schematic cross-sectional view of a motor-driven wheel having an in-wheel motor according to a fifth embodiment. Referring to FIG. 11, motor-driven wheel 500 has oil reservoirs 220, 230 in addition to the components of motor-driven wheel 100, and other specifics of motor-driven wheel 500 are identical to those of motor-driven wheel 100. Oil reservoir 220 is provided on one end-face of rotor 63 while oil reservoir 230 is provided on the other end-face of rotor 63. In other words, oil reservoirs 220, 230 are provided on respective end-faces of rotor 63 with respect to the direction of shaft 110 (rotational axis).

The oil discharged from opening end 160A of oil path 160 falls by gravitation to be supplied to stator core 61 and then supplied via stator core 61 to coil-ends of stator coils 62. The oil accordingly cools stator core 61 and stator coils 62.

The oil from the coil-ends of stator coils 62 is then stored in oil reservoirs 220, 230. Oil reservoirs 220, 230 rotate since they are fixed to rotor 63. Then, the oil stored in oil reservoirs 220, 230 is supplied again, by a centrifugal force caused by the rotation of rotor 63, to the inner periphery of the cylinder formed by stator coils 62, by centrifugal force caused by the rotation of rotor 63. The oil thus cools stator coils 62 again and is thereafter supplied to bearings 71-76 and planetary gear 80 to lubricate bearings 71-76 and planetary gear 80.

Oil pump 120 pumps up the oil from oil reservoir 130 to supply the pumped-up oil to oil path 150.

Oil path 150 supplies the oil from oil pump 120 to oil path 160, and oil path 160 discharges the oil from opening end 160A. The oil discharged from opening end 160A falls by gravitation to be supplied successively to stator core 61 and the coil-ends of stator coils 62 and cool stator core 61 and stator coils 62.

The oil having cooled stator core 61 and stator coils 62 is then stored in oil reservoirs 220, 230.

When AC current is supplied by a switching circuit (not shown) to stator coils 62, rotor 63 is rotated at a predetermined number of revolutions. The oil kept in oil reservoirs 220, 230 is then supplied again to the inner periphery of the cylinder formed by stator coils 62, by the centrifugal force generated by the rotation of rotor 63, to cool stator coils 62.

After this, the oil is supplied to bearings 71-76 and planetary gear 80 to lubricate bearings 71-76 and planetary gear 80 and thereafter returned to oil reservoir 130.

As discussed above, according to the fifth embodiment, the oil supplied from the outer periphery of stator core 61 falls by gravitation to cool stator core 61 and stator coils 62 and cool stator coils 62 again by the centrifugal force generated by the rotation of rotor 63.

Stator core 61 and stator coils 62 can thus be cooled from both of the inner periphery and the outer periphery of the cylinder formed by stator core and stator coils so that the cooling efficiency of stator core 61 and stator coils 62 can be improved.

Consequently, the available temperature range of motor 60 can be extended so that a motor vehicle having motor-driven wheels 500 mounted thereon can be driven under severe load conditions.

Further, since oil reservoirs 220, 230 storing the oil supplied via stator core 61 and stator coils 62 and supplying the oil again to stator coils 62 by the centrifugal force are provided on respective end-faces of rotor 63, the volume of the in-wheel motor capable of efficiently cooling motor 60 can be reduced.

It is noted that "in-wheel motor" of the fifth embodiment is configured of wheel disc 10, hub 20, housing 30, motor 60, bearings 71-76, planetary gear 80, shaft 110, oil pump 120, oil reservoirs 130, 220, 230, and oil paths 140, 160.

In addition, the in-wheel motor of the fifth embodiment may be configured of the above-described components of the in-wheel motor of the fifth embodiment and oil cooler 190 of the third embodiment or oil paths 210-214 of the fourth embodiment added thereto. Thus, the oil forced to be cooled can be supplied from opening end 160A to stator core 61 and stator coils 62, and the cooling capability of the oil supplied from oil reservoirs 220, 230 again to the inner periphery of the cylinder formed by stator coils 62 can be enhanced. The cooling efficiency of stator core 61 and stator coils 62 can further be improved.

Other details of the fifth embodiment are identical to those of the first embodiment.

Sixth Embodiment

Figure 12:
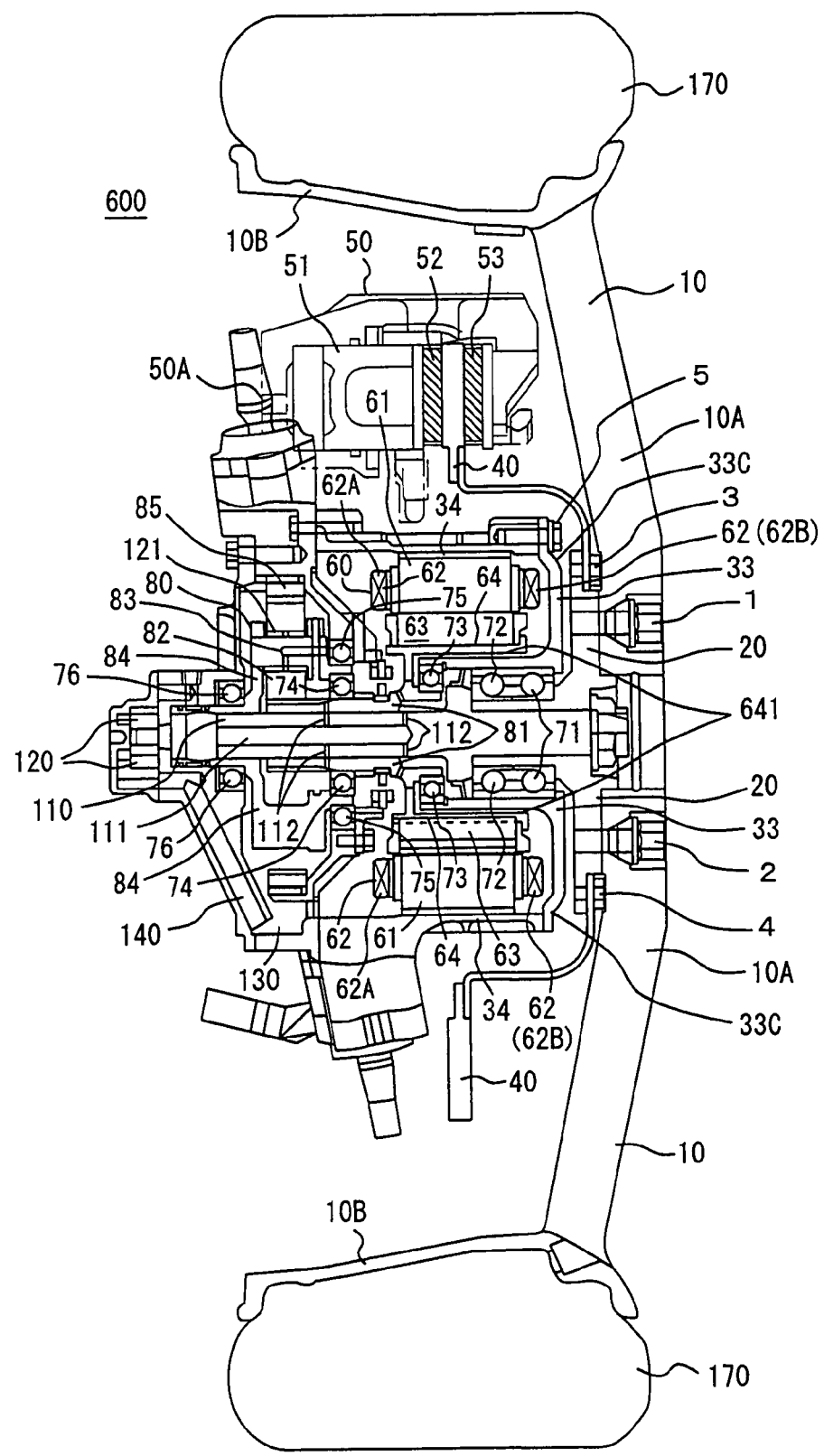
FIG. 12 is a schematic cross-sectional view of a motor-driven wheel having an in-wheel motor according to a sixth embodiment.

FIG. 12 is a schematic cross-sectional view of a motor-driven wheel having an in-wheel motor according to a sixth embodiment. Referring to FIG. 12, motor-driven wheel 600 differs from motor-driven wheel 100 in that oil paths 150, 160 are not included, cases 33, 34 are employed instead of case 30, and oil path 111 and oil holes 112 are additionally provided. Other specifics are identical to those of motor-driven wheel 100.

Motor-driven wheel 600 is suspended from a frame of a body of a motor vehicle by an upper arm and a lower arm (not shown).

On the left of hub 20, cases 33, 34 are placed. Case 33 is connected to case 34 with a screw 5. Cases 33, 34 house motor 60.

Motor 60 includes stator core 61, stator coils 62, rotor 63, and rotor shaft 64. Stator core 61 is fixed to case 34. Stator coils 62 each have coil-ends 62A, 62B. Coil end 62A is placed relatively closer to oil pump 120 while coil end 62B is placed relatively further from oil pump 120.

Rotor shaft 64 supports rotor 63. Rotor 63 and rotor shaft 64 are placed inside the inner periphery of stator core 61 and stator coils 62.

According to the sixth embodiment, shaft 110 has an oil path 111 and oil holes 112 therein. Oil pump 120 pumps up the oil stored in oil reservoir 130 via oil path 140 and supplies the pumped-up oil to oil path 111. Oil holes 112 discharge the oil from oil path 111.

When a switching circuit (not shown) mounted on the body of the motor vehicle having motor-driven wheel 600 mounted thereon supplies AC current to stator coils 62, rotor 63 rotates so that motor 60 outputs a predetermined torque. The output torque of motor 60 is then transmitted via sun gear shaft 81 to planetary gear 80. Planetary gear 80 converts, namely changes the output torque from sun gear shaft 81 by means of sun gear 82 and pinion gear 83 and then outputs the resultant output torque to planetary carrier 84. Planetary carrier 84 transmits the output torque of planetary gear 80 to shaft 110. Shaft 110 then rotates hub 20 and wheel disc 10 at a predetermined number of revolutions. Motor-driven wheel 600 is thus rotated at a predetermined number of revolutions.

Oil pump 120 pumps up the oil from oil reservoir 130 via oil path 140, and supplies the pumped-up oil to oil path 111 provided within shaft 110.

The oil supplied to oil path 111 is then discharged from oil holes 112 by the centrifugal force caused by the rotation of shaft 110 while the oil is passing through oil path 111. Oil path 121 then supplies the oil discharged from shaft 110 to planetary gear 80 and thereby lubricates planetary gear 80. Further, the oil discharged from shaft 110 cools coil-ends 62A of stator coils 62 and lubricates bearings 73-76.

Figure 13:
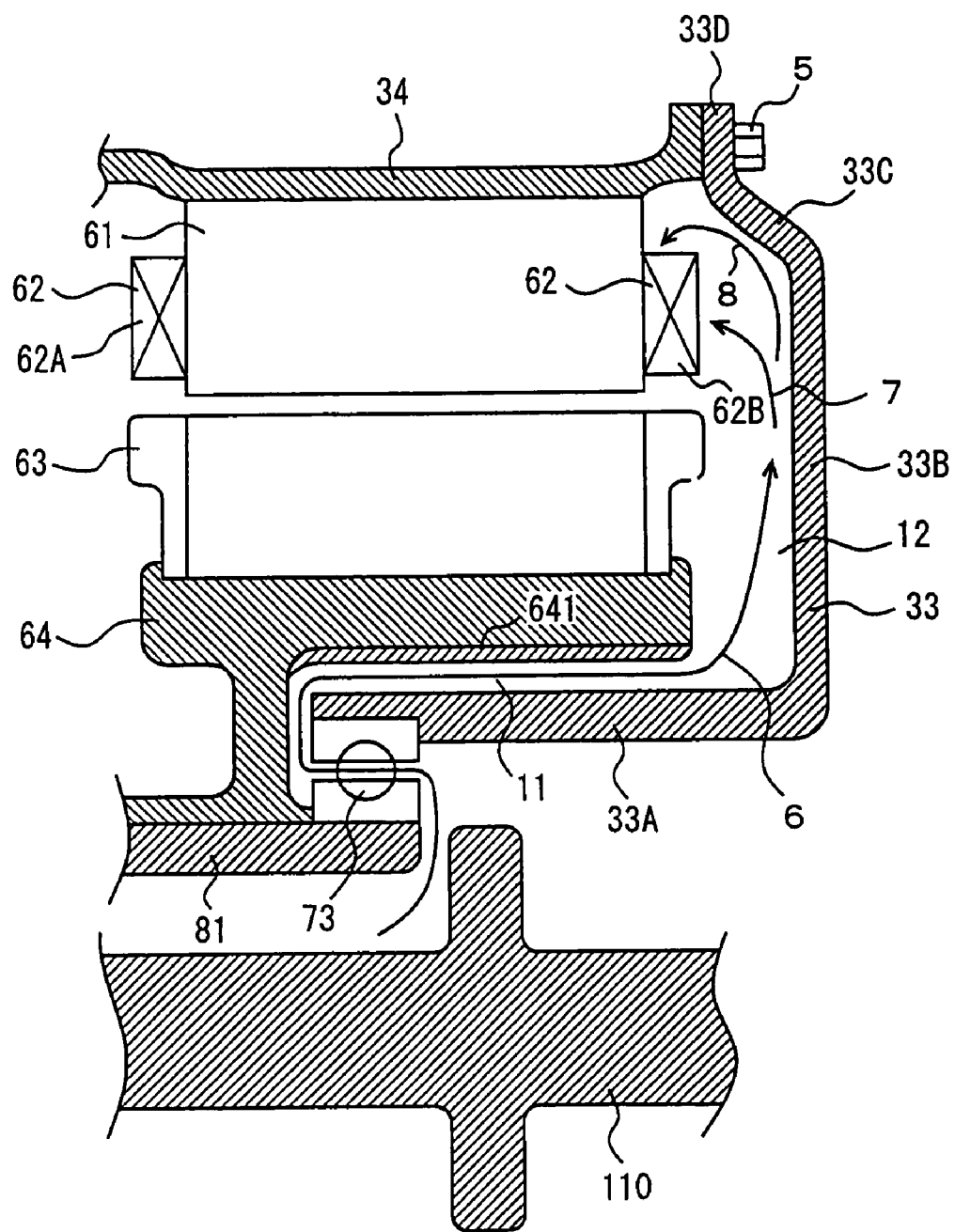
FIG. 13 is an enlarged view of cases, a stator core, a stator coil, a rotor and a rotor shaft.

FIG. 13 is an enlarged view of cases 33, 34, stator core 61, stator coils 62, rotor 63, and rotor shaft 64. Referring to FIG. 13, a description is given below of a mechanism for cooling coil-ends 62B of stator coils 62 by the oil discharged from shaft 110.

Case 33 has a lower portion 33A, a side portion 33B, an inclined portion 33C and a coupling portion 33D. Lower portion 33A is placed between rotor shaft 64 and shaft 110 substantially in parallel with rotor shaft 64 and shaft 110.

Side portion 33B is placed on the side, facing wheel disk 10, of stator core 61, stator coils 62, rotor 63 and rotor shaft 64. Side portion 33B has one end connecting to lower portion 33A and the other end connecting to inclined portion 33C.

Inclined portion 33C is placed diagonally above coil end 62B on the side thereof that faces wheel disc 10. Inclined portion 33C has one end connecting to side portion 33B and the other end connecting to coupling portion 33D. Inclined portion 33C thus forms an oblique plane between side portion 33B and coupling portion 33D. Coupling portion 33D is fastened to case 34 with screw 5.

Case 33 thus covers respective sides, facing wheel disc 10 and shaft 110 respectively, of stator core 61, stator coils 62, rotor 63 and rotor shaft 64.

Rotor shaft 64 has a screw groove 641 in a plane of rotor shaft 64 that faces lower portion 33A of case 33. Between screw groove 641 and lower portion 33A of case 33, a narrow spacing 11 is formed.

As rotor 63 and rotor shaft 64 rotate so that the oil is discharged from shaft 110 by the above-described mechanism, the discharged oil is supplied via bearing 73 to spacing 11 and the spacing 11 is filled with the oil.

As rotor shaft 64 rotates, the oil supplied to spacing 11 is moved rightward by a screwing action of screw groove 641 and then pushed out into a spacing 12. Since rotor shaft 64 rotates at a high speed, the oil is pressure-fed toward coil end 62B in the direction indicated by an arrow 6. The pressure-fed oil is supplied to coil end 62B as indicated by an arrow 7 to cool coil end 62B. Further, the pressure-fed oil is reflected by inclined portion 33C of case 33 as indicated by an arrow 8 to be supplied to the upper part of coil end 62B.

In this way, coil end 62 is efficiently cooled by the oil.

As discussed above, according to the sixth embodiment, screw groove 641 is provided in the surface of rotor shaft 64, and the screwing action of screw groove 641 caused by the rotation of rotor shaft 64 allows the oil to be supplied to coil ends 62B located relatively further from oil pump 120.

Thus, with the simple structure having screw groove 641 in the surface of rotor shaft 64, the oil can efficiently be supplied to one of coil-ends 62B of each of stator coils 62 that is located relatively further from oil pump 120.

Further, inclined portion 33C is placed diagonally above coil end 62B on the side thereof that faces wheel disc 10, and the oil pressure-fed by the screwing action of screw groove 641 is supplied to the upper portion of coil-end 62B.

If the part between side portion 33B and coupling portion 33D of case 33 is formed of a curved structure, the oil pressure-fed from spacing 11 is likely to remain in the curved portion. Then, inclined portion 33C is provided between side portion 33B and coupling portion 33D so that the oil pressure-fed from spacing 11 can be reflected toward coil-ends 62B and accordingly the supply of the oil to the upper portion of coil end 62B can be promoted.

As discussed above, coil-ends 62A located closer to oil pump 120 are cooled by the oil discharged from shaft 110. Then, with the screwing action of screw groove 641, the oil is pressure-fed to coil-ends 62B located relatively further from oil pump 120, so that coil ends 62A, 62A on both longitudinal ends of stator coils 62 can efficiently be cooled.

While the screw groove is provided on rotor shaft 64 according to the description above, the sixth embodiment is not limited to the screw groove provided in this manner. Specifically, the screw groove may be provided on lower portion 33A of case 33. In addition, screw grooves may be provided respectively on both of rotor shaft 64 and lower portion 33A of case 33.

It is noted that "in-wheel motor" of the sixth embodiment is configured of wheel disc 10, hub 20, cases 33, 34, motor 60, bearings 73-76, planetary gear 80, shaft 110, oil pump 120, oil reservoir 130, and oil path 140.

Moreover, "oil pressure-feeding structure" of this embodiment is configured of lower portion 33A of case 33 and screw groove 641.

Other details of the sixth embodiment are identical to those of the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An in-wheel motor comprising:
   a motor including a stator coil, said motor being a drive motor that drives a vehicle wheel;
   a shaft having a rotational axis rotated by an output torque of said motor;
   an oil pump mounted to one end of said shaft for rotation with said shaft about the axis of said shaft; and
   an oil pressure-feeding structure for pressure-feeding an oil from said oil pump to one of coil-ends of said stator coil that is provided on the other end of said shaft, in response to operation of said motor.

2. The in-wheel motor according to claim 1, wherein said oil pressure-feeding structure includes:
   a screw groove formed on a rotor shaft of said motor; and
   a case placed to face said screw groove.

3. The in-wheel motor according to claim 2, wherein
said case includes an inclined portion promoting feeding of said oil to the coil-end on the other end of said shaft.

4. The in-wheel motor according to claim 2, wherein between said rotor shaft and said case a narrow spacing is formed.

5. The in-wheel motor according to claim 2, wherein as a rotor of said motor rotates, oil entering said screw groove is supplied by a screwing action to said coil end.

6. The in-wheel motor according to claim 2, wherein as a rotor of said motor rotates, oil entering said screw groove impinges on an inclined portion of said case by a screwing action and is supplied to said coil end.

7. The in-wheel motor according to claim 1, wherein said shaft having a rotating axis is a shaft of said motor.

8. The in-wheel motor according to claim 1, wherein said oil pump is driven by said rotating shaft.

* * * * *